Sept. 24, 1963         W. F. PALMER         3,105,170
APPARATUS FOR CHARGING AND REGULATING
THE VOLTAGE ACROSS A CAPACITOR
Filed Aug. 10, 1960
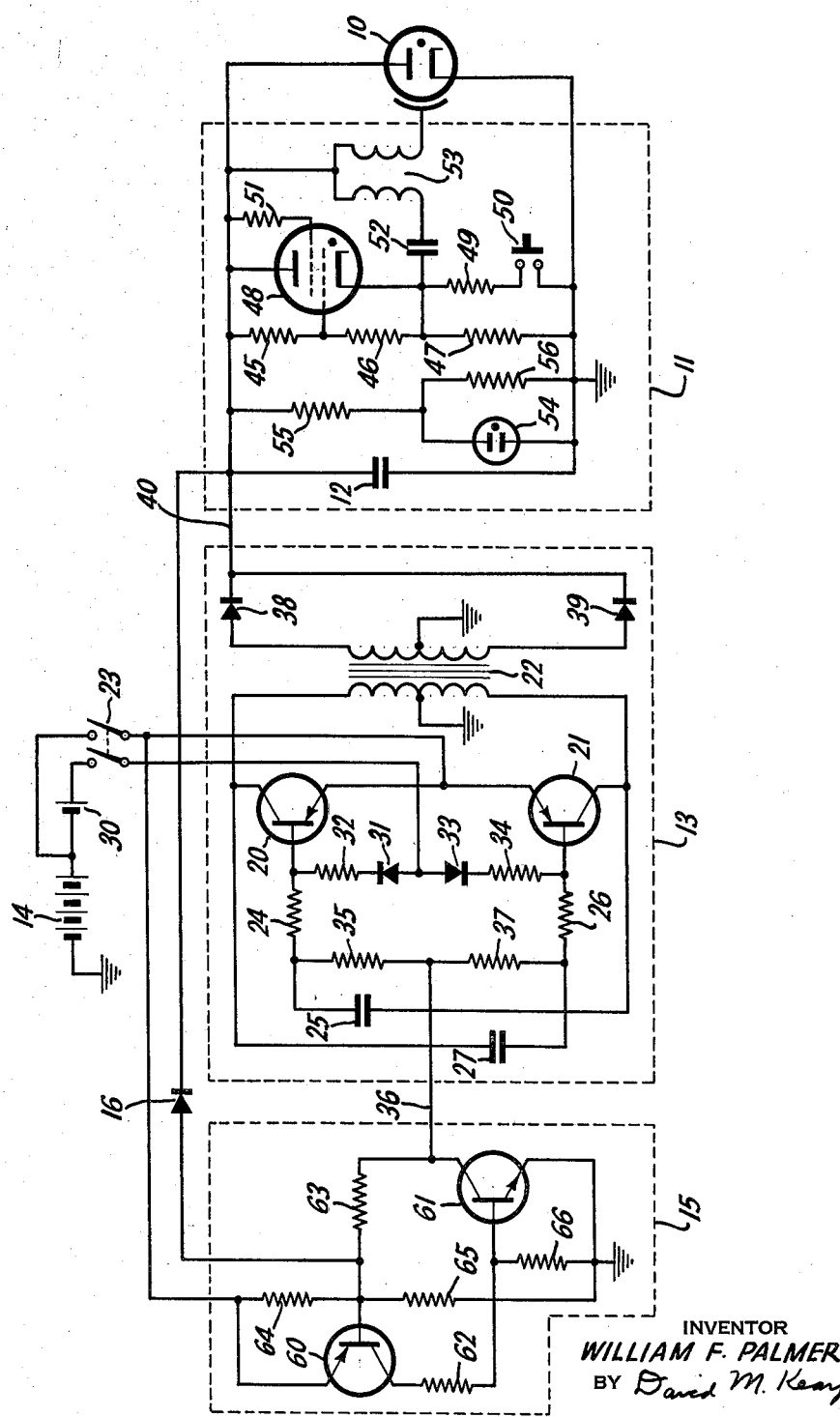
INVENTOR
*WILLIAM F. PALMER*
BY David M. Keary
AGENT

United States Patent Office 3,105,170
Patented Sept. 24, 1963

3,105,170
APPARATUS FOR CHARGING AND REGULATING THE VOLTAGE ACROSS A CAPACITOR
William F. Palmer, Carlisle, Mass., assignor to Sylvania Electric Products Inc., a corporation of Delaware
Filed Aug. 10, 1960, Ser. No. 48,740
9 Claims. (Cl. 315—183)

The present invention relates to electrical apparatus for charging and regulating the voltage across a capacitor. More particularly, it is concerned with apparatus which becomes activated to charge a capacitor when the voltage across the capacitor becomes less than a predetermined value and which becomes inactivated when the voltage across the capacitor reaches a predetermined value.

It is common practice in photographic flash units to obtain high intensity illumination for photographic purposes by discharging a charged capacitor through a gas-filled flash lamp. A low voltage D.C. power source is generally employed together with suitable circuitry in order to obtain the relatively high D.C. voltage which is needed to charge the flash capacitor to a value for each firing of the flash lamp. Since electronic photoflash apparatus of this type is generally portable, batteries are usually employed as the source of low D.C. voltage. High D.C. voltage is obtained from the batteries through the use of a D.C. to D.C. voltage converter. A converter includes an inverter circuit or vibrator arrangement for providing low alternating voltage or pulsating low D.C. voltage from the battery voltage, a transformer for changing the low alternating voltage or the pulsating low D.C. voltage to high A.C. voltage, and a rectifier for converting the high A.C. voltage to the high D.C. voltage which is applied to the flash capacitor in order to charge it.

It can readily be understood that under ordinary circumstances when a photographic flash unit of the type according to the foregoing description is being used, a substantial portion of the time during which the apparatus is turned on may be standby time; that is, elapsed time after the power supply has charged the capacitor to a suitable value and before the camera shutter is tripped discharging the capacitor through the flash lamp. During this time the power supply consumes energy from the batteries without producing any useful results. The energy loss may be significant, particularly when the apparatus includes the inexpensive commercial transformers commonly used. As the batteries age their output voltage drops and a longer period of time is required for the capacitor to be charged to the necessary level for firing the flash lamp. In addition, as the output voltage of the batteries decreases with age, the voltage which is developed across the capacitor is also less resulting in less illumination from the flash lamp when it is fired.

It is an object of the present invention, therefore, to provide an improved apparatus for charging and for regulating the voltage across a capacitor.

It is a more specific object of the invention to provide an improved photographic flash apparatus which consumes a small amount of electrical energy in the standby condition while maintaining the flash capacitor charged to a proper value for discharge through the flash lamp and which provides relatively constant light output substantially independent of variations in supply voltage.

Briefly, in accordance with the foregoing objects the apparatus of the invention includes a D.C. power supply for charging the flash capacitor. The power supply is automatically turned on or activated when the voltage across the capacitor becomes less than a predetermined value, and it is automatically turned off or inactivated when the voltage across the capacitor becomes greater than a predetermined value. An electronic switching means is employed for activating and inactivating the power supply. The switching means is actuated by triggering means responsive to the voltage across the capacitor.

Additional objects, features and advantages of the present invention will be apparent from the following detailed discussion and the accompanying drawing in which the single figure is a schematic representation of photographic flash apparatus according to the invention.

As shown in the drawing a gas-filled flash lamp or "strobe" light 10 is arranged to be fired by a firing circuit 11 which includes an energy storage or flash capacitor 12. The capacitor is discharged through the lamp to produce a flash of light. The flash capacitor is charged to the necessary voltage by a D.C. power supply which includes a D.C-to-D.C. voltage converter 13 for providing a high D.C. voltage from a low voltage source, such as a battery 14. A switching circuit 15 which operates in either of two states permits the converted to operate or inactivates it, depending on the state of the switching circuit. A voltage reference diode 16 connected between the flash capacitor and the switching circuit actuates the switching circuit causing it to switch from one state to the other in response to the voltage across the flash capacitor.

The D.C.-to-D.C. voltage converter 13 for charging the flash capacitor 12 includes an inverter circuit for obtaining a low A.C. voltage, a transformer for obtaining high A.C. voltage from the low A.C. voltage and a full-wave rectifier for obtaining high D.C. voltage from the high A.C. voltage. The inverter circuit is a transformer-loaded multivibrator employing two PNP transistors 20 and 21 together with the primary winding of the transformer 22 which also provides the voltage transformation. The emitters of the two inverter transistors are connected directly to each other, and they are also connected to the positive terminal of the main battery 14 through one set of contacts of a double-pole, single-throw, on-off switch 23. The collectors of the transistors are directly connected to opposite ends of the primary winding of the transformer. The center tap of the transformer primary winding is grounded. The base of the first inverter transistor 20 is connected through a base resistor 24 and a coupling condenser 25 to the collector of the second inverter transistor 21, and the base of the second transistor is connected to the collector of the first through a base resistor 26 and a coupling condenser 27. An auxiliary biasing battery 30 in series with the main battery 14 is connected through the second set of contacts of the on-off switch 23 to a base biasing network including an isolating diode 31 and a resistor 32 connected in series to the base of the first transistor and an isolating diode 33 and a resistor 34 connected in series to the base of the second transistor. A base biasing resistor 35 is connected to the base resistor 24 of the first inverter transistor and to a connecting lead 36 from the switching circuit, and a base biasing resistor 37 is connected to the base resistor 26 of the second inverter transistor and to the switching circuit lead 36. The secondary winding of the transformer 22 is grounded at its center tap, and its ends are connected to diodes 38 and 39 so as to provide a full-wave rectifier.

Under operating conditions with the switching circuit biasing the inverter transistors "on" in a manner to be explained hereinbelow, the inverter portion of the circuit operates as a transformer-loaded multivibrator with the two transistors conducting alternately. The pulsating D.C. thus produced through each half of the primary winding of the transformer induces high A.C. voltage across the secondary winding. The full-wave rectifier constituted by the diodes 38 and 39 rectifies the high A.C. voltage and provides high D.C. voltage on the converter output lead 40.

The flash lamp firing circuit 11 includes the energy storage or flash capacitor 12 which is connected between the high D.C. voltage lead 40 and ground. A voltage divider consisting of three resistors 45, 46, and 47 is connected in shunt across the flash capacitor. The first resistor 45 is connected between the anode and control grid of a trigger tube 48, and the second resistor 46 is connected between the control grid and the cathode of the trigger tube. A path to ground from the cathode of the trigger tube is provided through a resistor 49 in series with the contacts of the camera shutter switch 50. A resistor 51 is connected between the screen grid of the trigger tube and the high D.C. voltage lead. The cathode of the trigger tube is connected through an ignition condenser 52 and the primary winding of an ignition transformer 53 to the high D.C. voltage lead. The secondary winding of the ignition transformer is connected from the high D.C. voltage lead to the igniter electrode of the flash lamp 10. The flash lamp itself is connected in shunt with the flash capacitor 12. A neon indicator lamp 54 is connected across a portion of a voltage divider consisting of two resistors 55 and 56 shunted across the flash capacitor.

When high D.C. voltage is applied at the converter output lead 40, the flash capacitor charges and the voltage across it increases toward the applied voltage in the known manner. When the voltage across the capacitor has reached a predetermined desired value, the neon glow lamp 54 lights indicating that the apparatus is in readiness for the flash lamp to be fired. The flash lamp may then be fired by closing of the camera shutter switch 50. As will be readily appreciated this closing need only be momentary during the actuation of the camera shutter. When the switch is closed, the voltage on the cathode of the trigger tube 48 is reduced to near ground potential, thus making the control grid-to-cathode potential difference sufficient to cause the trigger tube to fire. The ignition condenser 52 in the trigger tube anode-to-cathode circuit, which has been charged to the voltage across the first two resistors 45 and 46 of the voltage dividers, discharges through the trigger tube and the current flows through the primary winding of the ignition transformer 53. A high voltage thus induced in the secondary winding of the transformer appears at the igniter electrode of the flash lamp and ionizes a portion of the gas in the lamp. The flash capacitor 12 then discharges across the anode-cathode gap in the lamp ionizing the gas and producing a brilliant flash of illumination. After the flash capacitor has been discharged, the power supply builds up the charge again in preparation for the next flash.

The switching circuit 15 for regulating the voltage across the flash capacitor includes a pair of complementary transistors which are regeneratively cross-coupled to provide an electronic switch having two operating states. The emitter of the PNP switching transistor 60 is connected directly to the positive terminal of the main battery 14 and the emitter of the NPN switching transistor 61 is connected directly to ground. The collector of the PNP transistor is connected through a load resistor 62 to the base on the NPN transistor, and the collector of the NPN transistor is connected through a load resistor 63 to the base of the PNP transistor. Operating bias on the base of the PNP transistor is obtained from a base resistor 64 connected between the emitter and base and a biasing resistor 65 connected between the base and ground. A base resistor 66 is connected between the base and emitter of the NPN transistor. The switching lead 36 to the converter 13 is connected directly to the collector of the NPN transistor. A voltage reference diode 16 for triggering the switching circuit from one state to the other is connected between the positive terminal of the flash capacitor and the base of the PNP transistor.

The switching circuit operates as a normally closed switch. That is, under conditions of no signal from the voltage reference triggering diode, as when the apparatus is first turned on, a low impedance path is provided from the switching lead 36 to ground. The PNP transistor 60 is biased to conduction by the potential drop across the base resistor 64 of the base resistor 64-biasing resistor 65 voltage divider. Current flow in the collector circuit of the PNP transistor causes a voltage drop across the load resistor 62 which biases the base of the NPN transistor positively with respect to its emitter and causes that transistor to conduct also. The regenerative cross-coupling of the transistors causes both of them to become saturated or turned "on." With both transistors in the high conduction or low impedance condition the voltage on the collector of the NPN transistor is low, approaching ground potential. This voltage is applied over the switching circuit lead 36 to the bases of the two inverter transistors 20 and 21 biasing them to the operating condition and thus activating the converter circuit for charging the flash capacitor.

As the charge of electrical energy stored in the flash capacitor and consequently the voltage across it builds up, eventually the reverse breakdown voltage of the voltage reference trigger diode 16 is reached. A reverse current then flows through the diode and the switching circuit biasing resistor 65 to ground. This current increases the voltage on the base of the PNP transistor, and the collector current through the PNP transistor tends to be reduced. This action in turn tends to reduce the voltage on the base of the NPN transistor 61 and consequently its collector current. The base-to-collector cross-coupling connections cause these actions to be cumulative or regenerative, and both transistors become biased to cut-off or are switched "off." With both transistors in the low conduction or high impedance condition the voltage on the collector of the NPN transistor is high. This voltage is applied over the switching circuit lead 36 to the bases of the two inverter transistors 20 and 21 biasing these transistors to cut-off. The converter circuit is thus inactivated.

When the voltage across the flash capacitor drops, either because of leakage or because the flash lamp has been fired, reverse current ceases to flow through the voltage reference diode 16. The bias voltage on the base of the PNP switching transistor 60 is thus reduced tending to cause current flow through the collector circuit. Because of the regenerative cross-coupling between the two switching transistors, both of them are switched "on" or to the high conduction condition. As has been previously described, this condition causes the converter to be activated.

As explained hereinabove when the switching transistors are "on," the switching circuit acts as a "closed" switch. The NPN transistor is in its high conduction condition and a low impedance path is provided between the bases of the inverter transistors and ground. This condition causes the inverter transistors to be biased for operation and they conduct in alternation providing an astable multivibrator action. When the complementary switching transistors are both "off," the switching circuit acts as an "open" switch. The NPN switching transistor is in its low conduction condition and presents a high impedance in the path between the bases of the inverter transistors and ground. The condition causes the bias on the bases of the inverter transistors to become sufficiently positive with respect to the emitters so that the inverter transistors are cut off. In order to insure that these transistors remain cut off and the inverter circuit inactivated while the electronic switch is "open," the auxiliary biasing network is provided. The auxiliary biasing battery 30 provides sufficient additional voltage over that of the main battery so that small currents flow through the paths provided including the isolating diodes 31 and 33, resistors 32 and 34, base resistors 24 and 26, and biasing resistors 35 and 37. The voltage established on the inverter transistor bases by this current flow is sufficiently positive with respect to the voltage on the emitters to insure that the transistors remain cut off. The currents provided by the auxiliary biasing network are insufficient to interfere with operation of the inverter circuit when the inverter transistors are biased for conduction by the switching circuit.

In summary, the photographic flash apparatus as described above operates in the following manner. When the on-off switch 23 is closed, the complementary transistors in the switching circuit 15 are both biased to the high conduction condition providing a negative bias on the bases of the PNP inverter transistors by way of the switching circuit lead 36. The inverter transistors then operate as a multivibrator being conductive and nonconductive in alternation and providing pulsating currents through alternate halves of the primary winding of the transformer 22. High A.C. voltage from the secondary of the transformer is rectified by the full-wave rectifier constituted by the diodes 38 and 39. The resulting high D.C. voltage is conducted to the firing circuit 11 and charges the flash capacitor 12, tending to build the voltage across the capacitor to the full voltage applied to the high D.C. voltage lead 40. When the capacitor has been charged to a predetermined desired value, the neon glow lamp 54 lights and reverse current flows through the voltage reference trigger diode 16. Reverse current flow from the voltage reference diode actuates the switching circuit triggering it "open" with both transistors "off" or in the low conduction condition. The "open" condition of the switching circuit places a positive voltage on the bases of the inverter transistors thus turning them "off." The "off" condition of the inverter transistors is maintained with the assistance of the auxiliary biasing network. Thus, it can be seen that with the capacitor charged to the desired value, all of the transistors in both the switching circuit and the power supply are cut off or in the low conduction condition.

When the voltage across the flash capacitor drops sufficiently, either because of discharge through the flash lamp when the camera shutter switch is closed or because of leakage through the various paths available, current flow through the trigger diode stops and the complementary transistors in the switching circuit are triggered "on." The "closed" switching circuit causes the bases of the inverter transistors to be biased for conduction and thus the converter circuit is activated. The flash capacitor is recharged by electrical energy from the power supply until the voltage across the capacitor is such that reverse current again flows through the voltage reference diode triggering the switching transistors "off." In this manner the flash capacitor is charged and the voltage across it maintained constant within narrow limits.

Photographic flash apparatus according to the invention provides several advantages over previously known types of apparatus. Battery drain is low since the converter is in operation applying power to the flash capacitor only to maintain the voltage across the capacitor at a level which is greater than a minimum value and less than a maximum value. During a standby period after the capacitor has been charged to the maximum value and before the voltage has fallen to the minimum value, all energy consuming components are in their low conduction condition and require only a minimum of power. The four transistors are "off" and there are no devices which must be activated to a high energy consuming condition in order to create an open circuit or its equivalent between the battery and the converter. In addition, uniformity of light output is obtained for each flash of illumination since the voltage across the flash capacitor is always substantially the same. The voltage across the capacitor depends on the reverse breakdown characteristic of the reference diode and not on the state of freshness of the batteries. As the battery output voltage decreases with age, a longer period of time is required to charge the capacitor after each flash, but the voltage to which it is charged is always the same until the battery voltage drops below a usable value. Since the voltage reference diode determines the voltage across the capacitor, a battery with a relatively high voltage output or a transformer with a high turns ratio may be employed so that the voltage available to the capacitor is considerably higher than the maximum voltage to which it is to be charged. With such an arrangement the capacitor is charged to the desired value of voltage rather rapidly, and the automatic regulating features of the apparatus prevent charging to more than the desired value.

The following is a list of specific components which may be employed in the circuit shown in the drawings to provide photographic flash apparatus according to the invention.

| Component | Specification |
|---|---|
| Flash lamp 10 | Sylvania type R4807. |
| Trigger tube 48 | Sylvania type 6483. |
| PNP transistor 20 | Sylvania type 2N242. |
| PNP transistor 21 | Sylvania type 2N242. |
| PNP transistor 60 | Sylvania type 2N34. |
| NPN transistor 61 | Sylvania type 2N214. |
| Voltage reference diode 16 | 400 volt silicon reference diode. |
| Diode 38 | 2 Sylvania type SR 500 in series. |
| Diode 39 | 2 Sylvania type SR 500 in series. |
| Diode 31 | Sylvania type 1N448. |
| Diode 33 | Sylvania type 1N448. |
| Transformer 22 | Sylvania type 23967-2. |
| Transformer 53 | Trigger coil Stancor type P6426. |
| Flash capacitor 12 | 525 microfarads, 450 volts. |
| Resistor 24 | 100 ohms. |
| Resistor 26 | 100 ohms. |
| Resistor 32 | 330 ohms. |
| Resistor 34 | 330 ohms. |
| Resistor 35 | 1,000 ohms. |
| Resistor 37 | 1,000 ohms. |
| Resistor 45 | 4.7 megohms. |
| Resistor 46 | 4.7 megohms. |
| Resistor 47 | 8.2 megohms. |
| Resistor 49 | 100 kilohms. |
| Resistor 51 | 10 megohms. |
| Resistor 55 | 820 kilohms. |
| Resistor 56 | 220 kilohms. |
| Resistor 62 | 10 kilohms. |
| Resistor 63 | 220 kilohms. |
| Resistor 64 | 4.7 kilohms. |
| Resistor 65 | 390 kilohms. |
| Resistor 66 | 4.7 kilohms. |
| Condenser 25 | 10 microfarads. |
| Condenser 27 | 10 microfarads. |
| Condenser 52 | 0.1 microfarad. |
| Neon glow lamp 54 | Type NE-2. |
| Battery 14 | 18 volts. |
| Battery 30 | 1.5 volts. |

A circuit employing components having the foregoing values maintained the voltage across the flash capacitor by switching between the "on" and "off" conditions at about 0.1 second intervals during standby operation. Thus, the transistors were biased to their high conduction condition about 50% of the time. Under these conditions voltage regulation of better than 5% was obtained. If it is considered desirable to reduce the switching rate and obtain less precise regulation of the voltage across the capacitor, a condenser may be added between the base and emitter of the PNP switching transistor 60 in shunt with the base resistor 64. This arrangement causes the delay between the initiation and completion of the switching action to be increased over that provided by the arrangement shown. Other modifications of the apparatus shown and described may obviously be made within the scope of the present invention.

What is claimed is:

1. Apparatus for maintaining a voltage across a capacitor including a D.C. power supply connected to the capacitor, a switching means connected to the power supply and having a first operating state during which said power supply is activated, thus permitting the power supply to charge the capacitor, and also having a second operating state during which the power supply is inactivated, and triggering means connected to the capacitor and to the switching means for triggering the switching means to said first state in response to a voltage across the capacitor less than a predetermined value and for triggering the switching means to said second state in response to a voltage across the capacitor greater than a predetermined value.

2. Photographic flash apparatus including a flash lamp, a flash capacitor, circuit means connecting said flash lamp to said flash capacitor, a D.C. power supply connected to the flash capacitor for charging the flash capacitor, a two-state switching circuit connected to said power supply and adapted to activate said power supply while in one state and to inactivate said power supply while in the other state, voltage reference means connecting said flash capacitor to said switching circuit for triggering said switching circuit from the one state to the other state in response to a voltage across said flash capacitor greater than a predetermined value and for triggering said switching circuit from the other state to the one state in response to a voltage across said flash capacitor less than a predetermined value, and means for discharging said flash capacitor through said flash lamp.

3. Photographic flash apparatus including a flash lamp, a flash capacitor, circuit means connecting said flash lamp to said flash capacitor, a low voltage D.C. source, a D.C. voltage converter circuit connected to said low voltage D.C. source and said flash capacitor for obtaining a high D.C. voltage from said low voltage source and charging said flash capacitor, a switching circuit including a complementary pair of transistors, the switching circuit being connected to said converter circuit and adapted to activate the converter circuit when both of the transistors of the pair are in the high conduction condition and to inactivate the converter circuit when both of the transistors of the pair are in the low conduction condition, voltage reference means connecting said flash capacitor to said switching circuit for triggering the transistors of said pair from the low conduction condition to the high conduction condition in response to a voltage across the flash capacitor less than a predetermined value and for triggering the transistors of said pair from the high conduction condition to the low conduction condition in response to a voltage across the flash capacitor greater than a predetermined value, and ignition means for initiating discharge of said flash capacitor through the flash lamp.

4. Photographic flash apparatus including a flash lamp, a flash capacitor, circuit means connecting said flash lamp to said flash capacitor, a low D.C. voltage source, an inverter circuit connected to said low D.C. voltage source for producing a low A.C. voltage, a transformer connected to said inverter circuit for producing high A.C. voltage from the low A.C. voltage, a rectifier circuit connected to said transformer for obtaining high D.C. voltage from the high A.C. voltage, circuit means connecting said rectifier circuit to said flash capacitor for charging said flash capacitor, a switching circuit including a pair of transistors of complementary types, cross-coupling means interconnecting said transistors in a regenerative manner whereby both transistors are in the high conduction condition or in the low conduction condition substantially at the same time, circuit means connecting the switching circuit to the inverter circuit for activating the inverter circuit when both of the transistors are in the high conduction condition and for inactivating the inverter circuit when both of the transistors are in the low conduction condition, voltage reference means connecting said flash capacitor to said switching circuit for triggering the transistors of said pair from the low conduction condition to the high conduction condition in response to a voltage across the flash capacitor less than a predetermined value and for triggering the transistors of said pair from the high conduction condition to the low conduction condition in response to a voltage across the flash capacitor greater than a predetermined value, and ignition means for initiating discharge of said flash capacitor through the flash lamp.

5. Photographic flash apparatus including a flash lamp, a flash capacitor, circuit means connecting said flash lamp to said flash capacitor, a low voltage battery, an inverter circuit connected to said battery and having two transistors, circuit means including the primary winding of a transformer interconnecting said transistors for rendering said transistors conducting and nonconducting in alternation whereby low A.C. voltage is produced in the primary winding, a secondary winding associated with the primary winding of the transformer for obtaining high A.C. voltage from the low A.C. voltage, a rectifier circuit connected to said secondary winding for obtaining high D.C. voltage from the high A.C. voltage, means connecting the flash capacitor to the rectifier circuit for charging the flash capacitor, a switching circuit including a pair of transistors of complementary type, regenerative circuit means cross-coupling the switching transistors causing both transistors to be in the high conduction condition or in the low conduction condition substantially at the same time, circuit means connecting the switching circuit to the two transistors of the inverter circuit for biasing the inverter transistors conducting when the switching transistors are in the high conduction condition and for biasing the inverter transistors nonconducting when the switching transistors are in the low conduction condition, biasing means connecting said battery to said switching circuit for biasing said switching transistors in the high conduction condition, a voltage reference diode connecting the flash capacitor to the switching circuit for biasing the switching transistors to the low conduction condition when the voltage across the capacitor becomes greater than a predetermined value, and ignition means for initiating discharge of said flash capacitor through the flash lamp.

6. Apparatus for maintaining a voltage across a capacitor including a D.C. power supply connected to the capacitor, a transistor switching circuit connected to the power supply and having a first operating state during which said power supply is activated, thus permitting the power supply to charge the capacitor, and also having a second operating state during which the power supply is inactivated, and triggering means connected to the capacitor and to the transistor switching circuit for triggering the transistor switching circuit to said first state in response to a voltage across the capacitor less than a predetermined value and for triggering the transistor switching circuit to said second state in response to a voltage across the capacitor greater than a predetermined value.

7. Apparatus for maintaining a voltage across a capacitor including a D.C. power supply connected to the capacitor, a switching circuit including a pair of regeneratively cross-coupled transistors, the switching circuit being connected to said power supply and adapted to activate the power supply when the switching circuit is in a first operating state and to inactivate the power supply when the switching circuit is in a second operating state, and voltage reference means connecting said capacitor to said switching circuit for triggering the switching circuit to said first operating state in response to a voltage across the capacitor less than a predetermined value and for triggering the switching circuit to said second operating state in response to a voltage across the capacitor greater than a predetermined value.

8. Apparatus for maintaining a voltage across a capacitor including a transistor D.C. power supply connected to the capacitor, a switching circuit including a pair of regeneratively cross-coupled transistors, the switching circuit having a first operating state established by a first set of conduction conditions of said switching circuit transistors and having a second operating state established by a second set of conduction conditions of said switching circuit transistors, circuit means connecting the switching circuit to the D.C. power supply for providing transistor operating bias to the D.C. power supply to activate the D.C. power supply when the switching circuit is in the first operating state and to inactivate the D.C. power supply when the switching circuit is in the second operating state, and voltage reference means connecting the capacitor to said switching circuit for triggering the switching circuit transistors from the first set of conduction conditions to the second set of conduction conditions in response to a voltage across the capacitor greater than a predetermined value and for triggering the switching circuit transistors from the second set of conduction conditions to the first set of conduction conditions in response to a voltage across the capacitor less than a predetermined value.

9. An electrical circuit comprising, in combination: a storage capacitor; a transistor vibrator for charging said capacitor from a source of D.-C. potential; a control transistor circuit connected to render said vibrator inoperative when said control transistor circuit is biased to a particular conduction condition; and a circuit element, conductive upon the application thereto of a predetermined potential, connected to bias said control transistor circuit to said particular conduction condition in response to the existence of a predetermined voltage on said capacitor.

References Cited in the file of this patent
UNITED STATES PATENTS

| | | |
|---|---|---|
| 2,901,671 | Most | Aug. 25, 1959 |
| 2,935,650 | Rock | May 3, 1960 |
| 2,944,191 | Kapteyn | July 5, 1960 |
| 2,946,924 | Gerlach et al. | July 26, 1960 |